(12) United States Patent
Trebouet et al.

(10) Patent No.: US 10,682,987 B2
(45) Date of Patent: Jun. 16, 2020

(54) DEVICE FOR CLEANING AN OPTICAL SENSOR, AND ASSOCIATED DRIVER ASSISTANCE SYSTEM AND CLEANING METHOD

(71) Applicant: Valeo Systèmes d'Essuyage, Le Mesnil Saint Denis (FR)

(72) Inventors: Marcel Trebouet, Le Mesnil Saint Denis (FR); Giuseppe Grasso, Issoire (FR); Grégory Kolanowski, Issoire (FR); Frédéric Bretagnol, Issoire (FR); Gilles Le-Calvez, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 81 days.

(21) Appl. No.: 15/718,726

(22) Filed: Sep. 28, 2017

(65) Prior Publication Data
US 2018/0086316 A1 Mar. 29, 2018

(30) Foreign Application Priority Data

Sep. 29, 2016 (FR) ...................................... 16 59284

(51) Int. Cl.
| | | |
|---|---|---|
| *B60S 1/56* | (2006.01) | |
| *B60S 1/46* | (2006.01) | |
| *B60S 1/52* | (2006.01) | |
| *B60S 1/54* | (2006.01) | |
| *B05B 15/70* | (2018.01) | |

(Continued)

(52) U.S. Cl.
CPC .................. *B60S 1/46* (2013.01); *B05B 1/02* (2013.01); *B05B 9/0403* (2013.01); *B05B 12/02* (2013.01); *B05B 15/70* (2018.02); *B08B 3/08* (2013.01); *B08B 5/02* (2013.01); *B08B 17/02* (2013.01); *B60S 1/52* (2013.01); *B60S 1/528* (2013.01); *B60S 1/544* (2013.01); *B60S 1/56* (2013.01); *G02B 27/0006* (2013.01)

(58) Field of Classification Search
None
See application file for complete search history.

(56) References Cited

U.S. PATENT DOCUMENTS

| 10,293,794 B2 * | 5/2019 | McAndrew ............. B60S 1/528 |
| 2015/0040953 A1 * | 2/2015 | Kikuta ....................... B60S 1/52 |
| | | 134/123 |
| 2015/0203076 A1 * | 7/2015 | Irie ....................... H04N 5/2171 |
| | | 134/56 R |

FOREIGN PATENT DOCUMENTS

| DE | 10 2014 220257 A1 | 4/2016 |
| DE | 2014220257 A1 * | 4/2016 |

(Continued)

OTHER PUBLICATIONS

English machine translation of DE2014220257A1.*

(Continued)

*Primary Examiner* — Michael E Barr
*Assistant Examiner* — Jason P Riggleman
(74) *Attorney, Agent, or Firm* — Osha Liang LLP

(57) ABSTRACT

The present invention concerns a device (1) for cleaning an optical sensor (3), in particular intended to equip a motor vehicle, comprising a nozzle (5) for dispensing a cleaning liquid, characterised in that the cleaning liquid dispensing nozzle (5) is a drip dispensing nozzle and is configured to deposit the cleaning liquid on the optical sensor (3) in individual drops.

13 Claims, 6 Drawing Sheets

Figure 1:
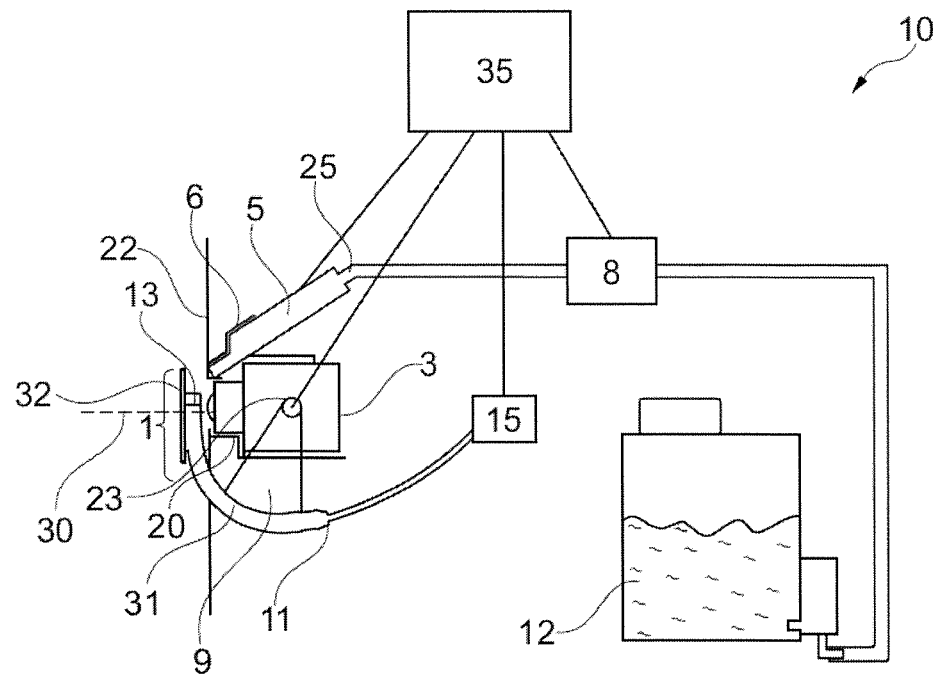

(51) Int. Cl.
*B05B 1/02* (2006.01)
*B05B 9/04* (2006.01)
*B05B 12/02* (2006.01)
*B08B 3/08* (2006.01)
*B08B 5/02* (2006.01)
*B08B 17/02* (2006.01)
*G02B 27/00* (2006.01)

(56) References Cited

FOREIGN PATENT DOCUMENTS

| | | |
|---|---|---|
| EP | 2252481 B1 | 4/2014 |
| FR | 2861348 B1 | 12/2006 |
| FR | 2858280 B1 | 12/2008 |
| WO | 2015/157744 A1 | 10/2015 |

OTHER PUBLICATIONS

Preliminary Research Report issued in French application No. FR1659284 dated May 15, 2017 (2 pages).
Written Opinion on the Patentability of the Invention issued in French application No. FR1659284 dated Sep. 29, 2016 (4 pages).

\* cited by examiner

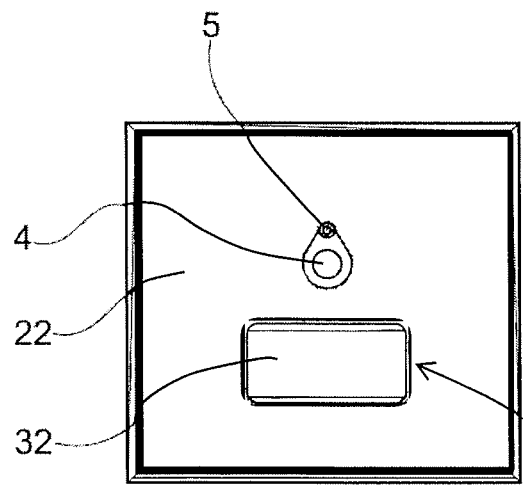
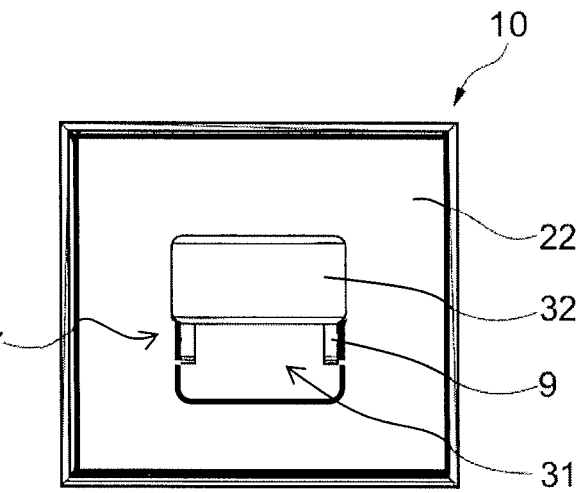
Fig. 9A    Fig. 9B
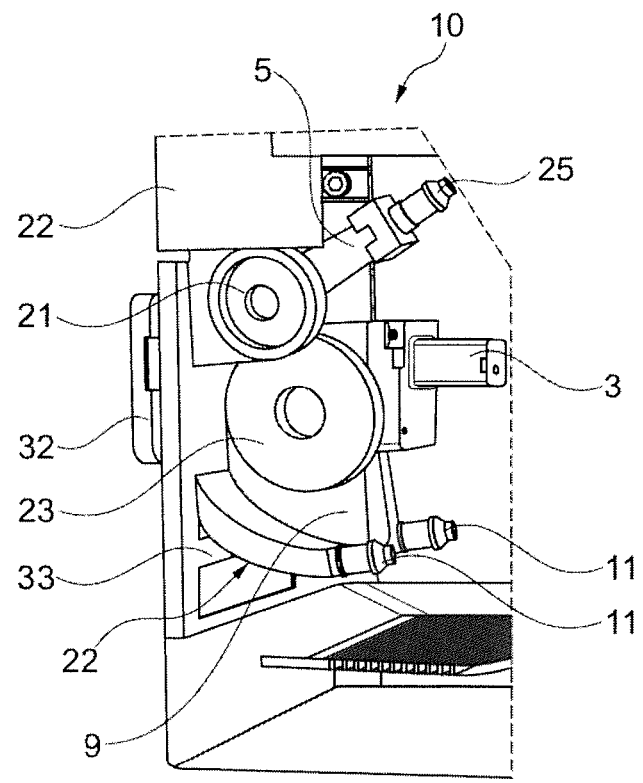
Fig. 10

DEVICE FOR CLEANING AN OPTICAL SENSOR, AND ASSOCIATED DRIVER ASSISTANCE SYSTEM AND CLEANING METHOD

The present invention relates to the field of driver assistance and, in particular, to driver assistance systems installed on certain vehicles. The driver assistance system can comprise an optical sensor, such as, for example, a camera comprising a lens. More particularly, the invention concerns a device for cleaning such an optical sensor, and a method for cleaning an optical sensor implemented by said cleaning device, the optical sensor being able to be arranged inside a body part of a motor vehicle, for example.

Many motor vehicles are today equipped with front, rear or indeed side viewing cameras. In particular, they form part of driver assistance systems, such as parking assistance systems or line-crossing detection systems, for example.

Cameras that are installed inside the passenger compartment, against the rear window, for example, to provide parking assistance, are known. These cameras are well protected from external weather hazards and the dirt that can be caused by organic or inorganic pollutants. Such cameras can, moreover, benefit from the systems for defrosting and cleaning the rear window, for example, such as a heating wire incorporated into the rear window that can defrost the rear window and the optical sensor installed in this configuration.

However, the angle of view proposed by such cameras is not optimal, in particular for providing parking assistance, because they do not display obstacles located close to the rear of the vehicle, for example. Partly for this reason, it is preferable to install these driver assistance systems outside the passenger compartment, at different locations depending on the desired use, for example at the registration plate or in the external rear-view mirrors.

In such a case, the driver assistance system and, in particular, the camera of such a system, is greatly exposed to weather hazards and to airborne organic or inorganic dirt. When it is raining or snowing, for example, rain, airborne dirt and salt, or indeed snow can greatly affect the operability of the driver assistance system, or indeed make it inoperative.

It therefore appears to be necessary to regularly clean these driver assistance systems in order to ensure they remain correctly operational.

However, if the vehicle comprises several driver assistance systems comprising optical sensors, the quantity of cleaning liquid required to ensure the correct operation of same can be considerable, meaning that the cleaning liquid tank needs to be large enough to ensure the user of the vehicle is not required to fill the cleaning liquid tank too often.

Also, increasing the volume of cleaning liquid inside the vehicle will increase the mass of the vehicle and therefore increase its energy consumption.

A driver assistance system equipped with an optical sensor and comprising a device for cleaning said optical sensor having a nozzle for spraying a cleaning liquid is known from document EP2252481. The spray nozzle according to this document is movable below the optical sensor between a stowed position and a cleaning position. The spray nozzle is configured to spray a cleaning liquid onto the optical element of said optical sensor.

However, such a cleaning device cannot be used at the same time as the driver assistance system because, when the spray nozzle is in the cleaning position, it occupies the field of view of the optical sensor. Therefore, during phases of cleaning the optical sensor, the latter is inoperative. Moreover, such a cleaning device appears to use relatively large quantities of cleaning liquid, because it sprays this cleaning liquid.

Also, a device for cleaning an optical sensor installed in a casing for protecting same comprising a viewing window, is known from document FR2861348, in the name of the applicant. The cleaning device comprises a nozzle for spraying a cleaning liquid that makes it possible to spray cleaning liquid onto the window of the protective casing.

However, it is possible for such a cleaning device to consume quite significant quantities of cleaning liquid.

A rear viewing device for a motor vehicle having an optical sensor inside a protective casing is also known from document FR2858280, in the name of the applicant. The protective casing comprises a viewing window arranged facing the optical element of the optical sensor and means for cleaning said viewing window. The cleaning means described in this document have, for example, a wiper seal for wiping the viewing window of the protective casing, installed in front of the optical sensor.

However, such cleaning means can be insufficiently effective against dirt encrusted on the viewing window. Moreover, the presence of the wiper seal can create micro-scratches on the viewing window and, over time, these micro-scratches can adversely affect the correct operation of the rear viewing device.

The present invention proposes to at least partially overcome the disadvantages of the prior art mentioned above, by proposing a device for cleaning an optical sensor, intended to be installed on a motor vehicle, making it possible to effectively clean said optical sensor.

Another aim of the present invention, which is different from the first, is to propose a device for cleaning an optical sensor that consumes a small amount of cleaning liquid.

Another aim of the present invention, which is different from the preceding aims, is to propose a driver assistance system having a cleaning device that allows the optical sensor that equips such a driver assistance system to function optimally regardless of the weather conditions.

To this end, the invention concerns a device for cleaning an optical sensor installed in a casing, in particular intended to equip a motor vehicle, comprising a dispensing nozzle for dispensing a cleaning liquid, characterised in that the cleaning liquid dispensing nozzle is a drip dispensing nozzle and is configured to deposit the cleaning liquid on the optical sensor in individual drops.

Therefore, the cleaning device can be installed on any type of optical sensor comprising an optical element, like a camera comprising a lens, intended to equip a motor vehicle, such as, for example, optical sensors installed inside body parts or indeed optical sensors installed outside the vehicle.

The term "dirt" denotes traces of organic pollutants, such as insects, or inorganic pollutants, such as mud, as well as traces left by drops of water, for example.

When it rains, for example, dirt can be deposited on the optical element of the optical sensor and can prevent said optical sensor from functioning correctly. The cleaning device can effectively control the cleaning of this optical sensor without necessarily using large quantities of cleaning liquid, by depositing one or more drop(s) of cleaning liquid on the optical element of the optical sensor.

The device for cleaning the optical sensor according to the invention can further comprise one or more of the following features alone or in combination:

The cleaning device comprises a support for the cleaning liquid dispensing nozzle, said support being arranged in a fixed manner relative to the cleaning device.

The cleaning liquid dispensing nozzle can be configured to be mounted movable in the support between:
- a rest position in which the dispensing nozzle is configured to be retracted relative to an optical element of the optical sensor, and
- an active position in which the dispensing nozzle is configured to be located above the optical element of the optical sensor so as to deposit said at least one drop of cleaning liquid on the optical element of the optical sensor by gravity.

The cleaning device can comprise a metering pump configured to supply the dispensing nozzle with cleaning liquid in order to deposit a predefined volume of cleaning liquid on the optical sensor in drips.

In one particular embodiment, the dispensing nozzle can be mounted telescopically movable in order to shift from its rest position to its active position.

In another embodiment, the dispensing nozzle can be mounted movable in translation in order to shift from its rest position to its active position.

The cleaning device can further comprise a spray element movable between:
- a stowed position in which the spray element is configured to be positioned outside the field of view of the optical sensor, and
- at least one cleaning position in which the spray element is configured to be positioned in front of the optical sensor.

When the spray element occupies a cleaning position, it is positioned between the optical element and one or more objects, images of which the optical sensor transmits.

The spray element comprises a nozzle for spraying a compressed air flow configured to spray a compressed air flow over the optical element when the spray element is in a cleaning position.

In one variant, the spray element can comprise a flexible blade configured to allow the optical element of the optical sensor to be cleaned by mechanical action.

The cleaning device can comprise a drive mechanism configured to move the spray element between its stowed position and said at least one cleaning position.

In one variant, the drive mechanism can comprise at least one actuator linked directly to the spray element so as to move the spray element between its stowed position and a cleaning position.

In another variant, the drive mechanism can comprise at least one actuator and a coupling system configured to be driven by the at least one actuator so as to move the spray element between its stowed position and a cleaning position.

In this other variant, the actuator engages with the coupling system by means of at least one of the elements chosen from the following list: a drive roller, a system of matching gears, a belt, and a rack and pinion system.

The spray element can be movable in rotation between its stowed position and said at least one cleaning position.

The present invention also concerns a driver assistance system comprising at least one cleaning device as previously described, at least one optical sensor, and at least one electronic control unit configured to control the cleaning device.

Using such a driver assistance system makes it possible to avoid manually cleaning the optical element of the optical sensor in order to eliminate encrusted dirt and maintain the correct operation of the driver assistance system.

The driver assistance system according to the invention can further comprise one or more of the following features alone or in combination:

The electronic control unit can be configured to control the drive mechanism, so as to move the spray element between its stowed position and said at least one cleaning position.

The electronic control unit can be configured to trigger the spraying of the compressed air flow over the optical element when the spray element is in a cleaning position and to stop said spraying of the compressed air flow when the spray element has returned to the stowed position.

In one variant, the electronic control unit can be configured to control the pressure at which the compressed air flow is sprayed over the optical element of the optical sensor.

The electronic control unit can be configured to control the volume of cleaning liquid drawn by the metering pump and deposited in drips on the optical element of the optical sensor.

The invention also concerns a method for cleaning an optical sensor constituting a driver assistance system as previously described, characterised in that it comprises the following steps:
- moving the spray element to bring said spray element into at least one cleaning position,
- depositing at least one first drop of cleaning liquid on the optical element of the optical sensor, and
- spraying a first compressed air flow over the optical element.

The method for cleaning the optical sensor according to the invention, using a single drop of cleaning liquid, for example, makes it possible to avoid using large quantities of cleaning liquid in order to achieve a satisfactory level of cleanliness so as to ensure the optical sensor continues to operate correctly regardless of the weather conditions.

Using a first compressed air flow in the form of a pressurised knife, for example, makes it possible to dislodge and remove dirt that may have been deposited on the optical element of the optical sensor, so as to maintain the correct operation of the latter. Thus, spraying a compressed air flow in addition to using the cleaning liquid makes it possible, inter alia, to further reduce the volumes of cleaning liquid required in order to effectively clean the optical element of such an optical sensor.

The method according to the invention can also further comprise the following steps, alone or in combination:
- depositing at least one second drop of cleaning liquid on the optical element of the optical sensor,
- spraying a second compressed air flow, said second compressed air flow being sprayed at a pressure lower than that of the first compressed air flow, over the optical element of the optical sensor, and
- moving the spray element to bring said spray element from said at least one cleaning position to the stowed position.

Moreover, the cleaning liquid used during this method can comprise an additive configured to deposit a protective layer on the optical element in order to facilitate the cleaning of said optical element.

Depositing a second drop of cleaning liquid and spraying the second compressed air flow makes it possible to implement a preventive treatment step in order to deposit a protective layer on the optical element so as to limit the likelihood of dirt adhering to same or indeed to facilitate the elimination of said dirt. Indeed, the second air flow helps spread the drop of cleaning liquid over the optical element, and when the cleaning liquid has an additive, said additive can deposit a protective layer on the optical element upon which dirt is deposited. The protective layer can be semi-soluble, allowing it to be eliminated along with the dirt deposited thereon simply by wetting.

Figure 2:
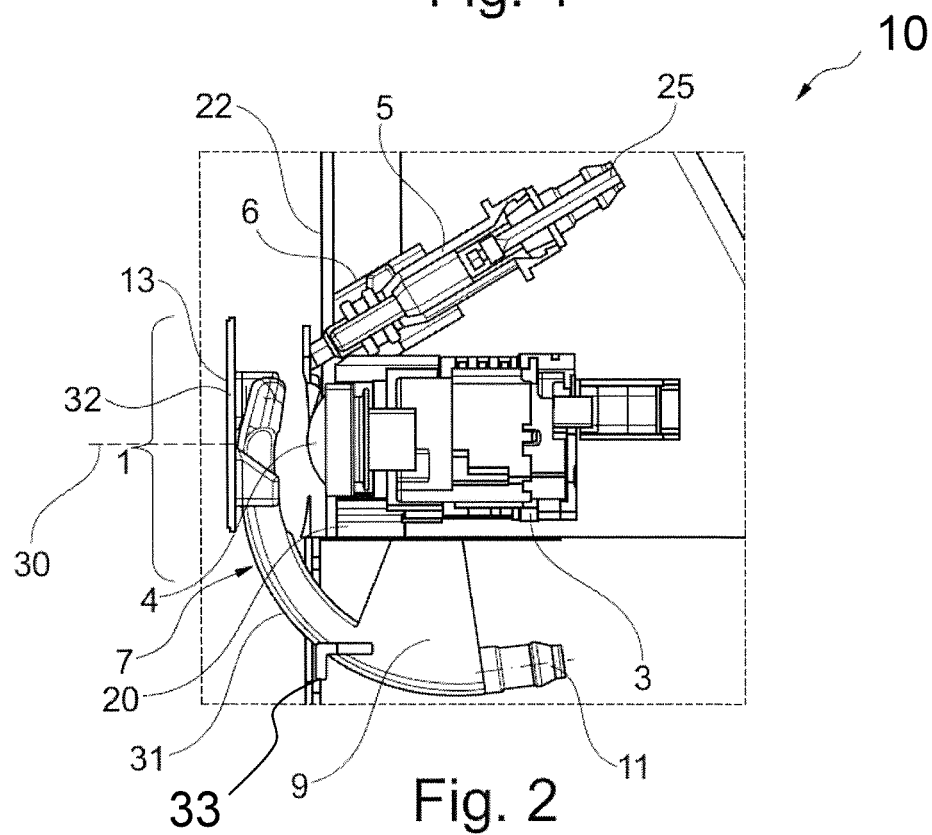
Figure 3:
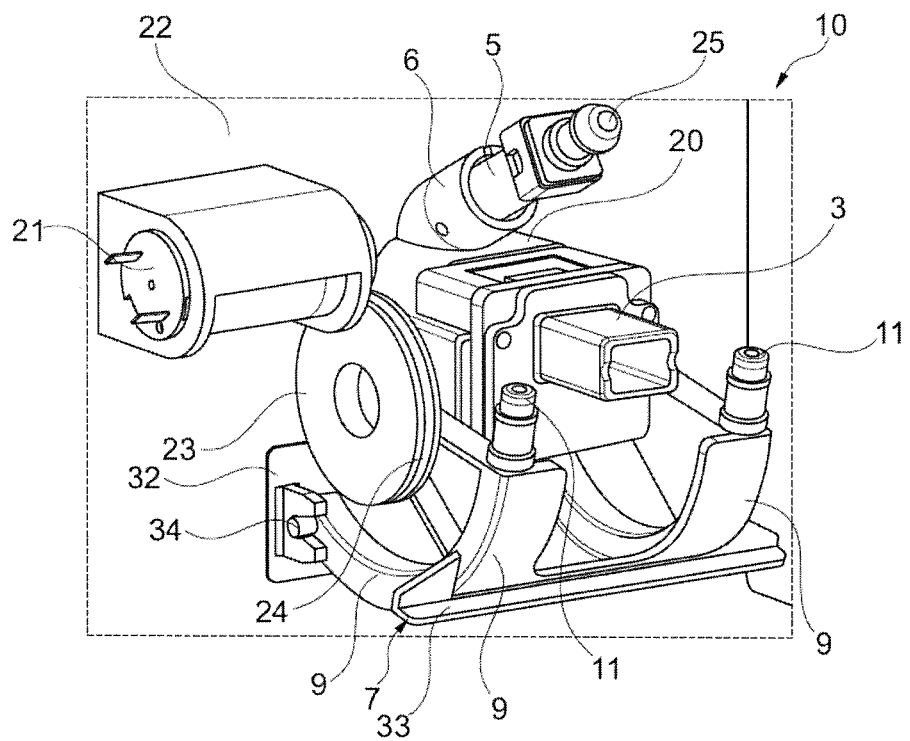
Figure 4:
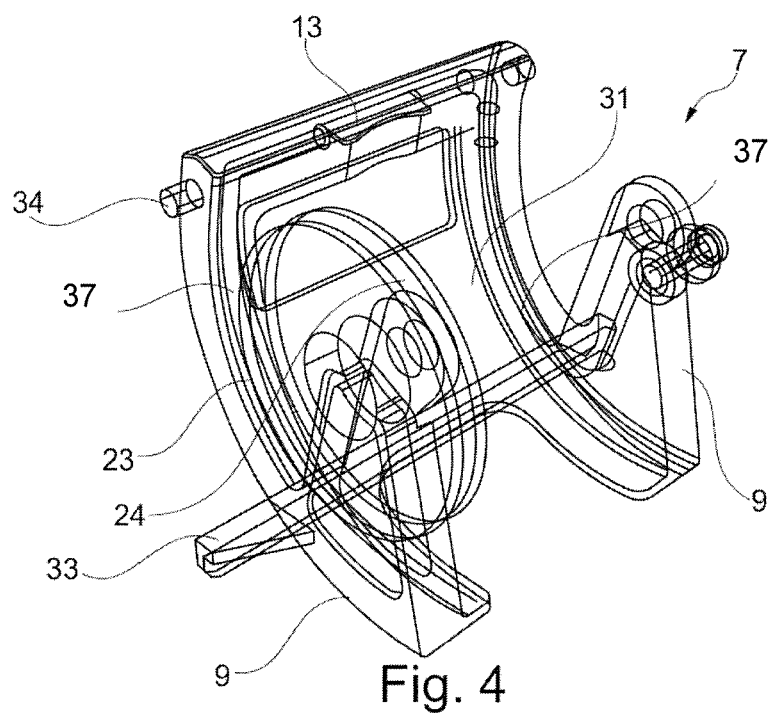
Figure 5A:
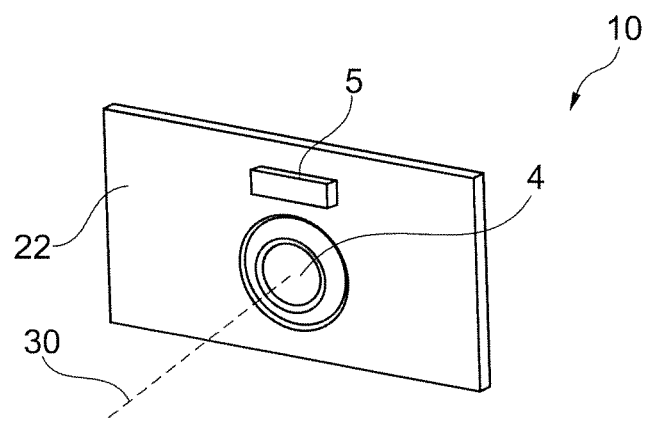
Figure 5B:
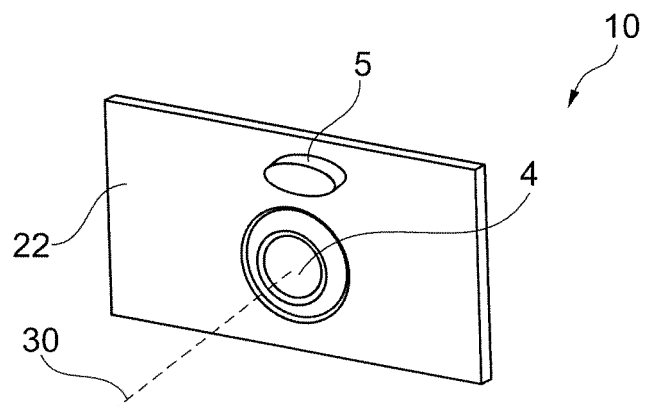
Figure 5C:
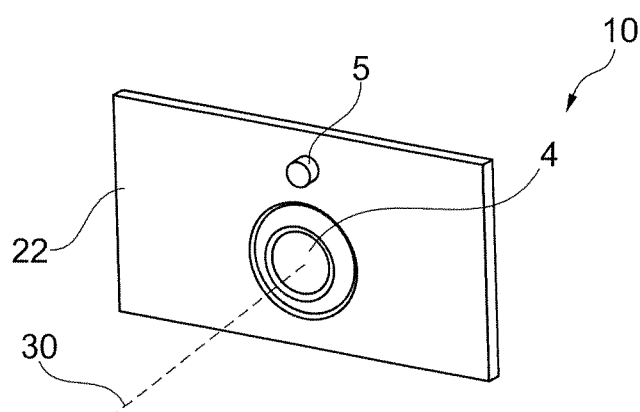
Figure 6:
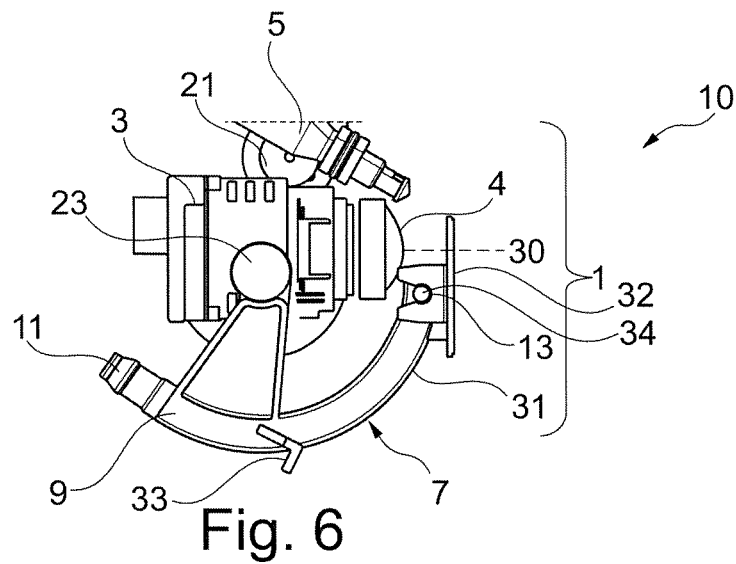
Figure 7:
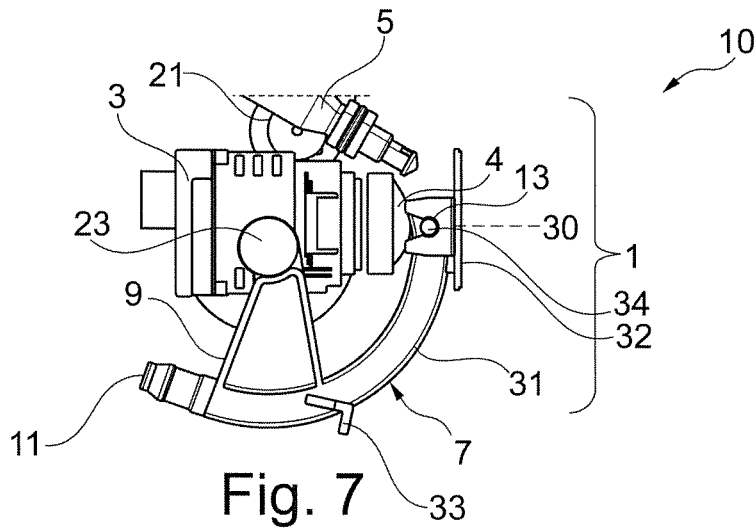
Figure 8:
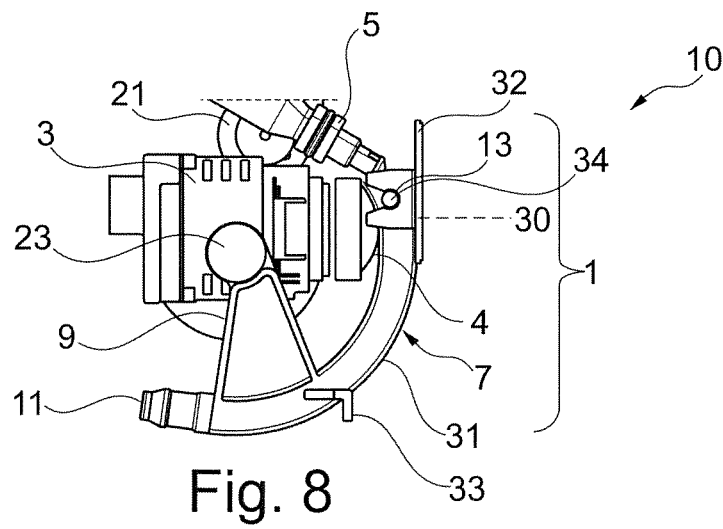
Figure 11:
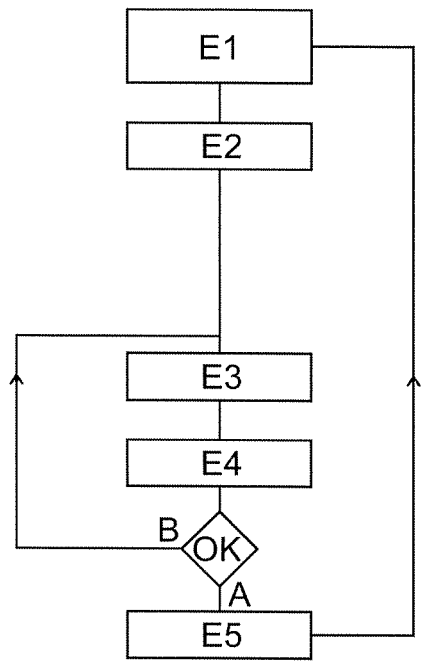
Figure 12:
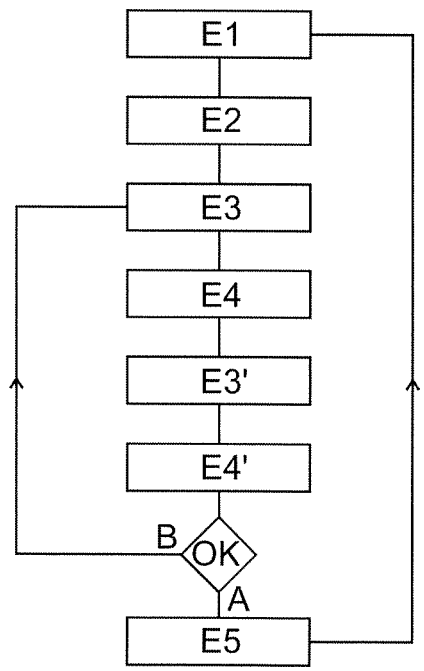

Other advantages and features will be disclosed upon reading the description and examining the appended drawings in which:

FIG. 1 is a schematic view of a driver assistance system mounted in a body part of a motor vehicle and comprising a device for cleaning an optical sensor, FIG. 2 is a schematic lateral view of the cleaning device showing a spray element of the cleaning device in greater detail, FIG. 3 is a schematic rear perspective view of the driver assistance system of FIG. 2 showing the cleaning device with the spray element in a stowed position, FIG. 4 is a partial schematic perspective view of the spray element, FIG. 5A is a partial schematic front perspective view of the driver assistance system comprising a dispensing nozzle having a rectangular depositing end, FIG. 5B is a partial schematic front perspective view of the driver assistance system comprising a dispensing nozzle having an oval depositing end, FIG. 5C is a partial schematic front perspective view of the driver assistance system comprising a dispensing nozzle having a circular depositing end, FIG. 6 is a schematic perspective view of the driver assistance system of FIG. 2 showing the cleaning device with the spray element in a first cleaning position, FIG. 7 is a schematic perspective view of the driver assistance system of FIG. 6 showing the cleaning device with the spray element in an intermediate cleaning position, FIG. 8 is a schematic perspective view of the driver assistance system of FIGS. 6 and 7 showing the cleaning device with the spray element in a final cleaning position, FIG. 9A is a schematic front view of the driver assistance system with the spray element in the stowed position, FIG. 9B is a schematic front view of the driver assistance system with the spray element in its final cleaning position, FIG. 10 is a schematic perspective view of a partial cross section of the driver assistance system of FIG. 9B, FIG. 11 is an operating diagram of the cleaning device according to a first embodiment, and FIG. 12 is an operating diagram of the cleaning device according to a second embodiment.

In these figures, the identical elements are given the same reference numbers.

The following embodiments are examples. Although the description refers to one or more embodiments, this does not necessarily mean that each reference concerns the same embodiment, or that the features apply only to a single embodiment. Individual features from different embodiments can also be combined or interchanged in order to produce other embodiments.

Reference is made in the following description to first and second drops of cleaning liquid, or indeed to first and second compressed air flows. This is done purely for indexing purposes to distinguish between and designate elements that are similar but not identical. This indexing does not imply a priority of one element over another, and such designations can easily be interchanged without departing from the scope of the present description. Nor does this indexing imply a time order, for example in order to assess the functioning of the device for cleaning the optical sensor.

In the following description, the term "dirt" denotes traces of organic pollutants, such as insects, for example, or inorganic pollutants, such as traces of mud, for example, as well as drops of water.

In the following description, the terms "top", "upper" and "above" denote the arrangement of the elements in question in the figures that generally corresponds to the arrangement of same when mounted in a body part of a motor vehicle. In the following description, the term "compressed air knife" denotes the spraying of compressed air under high pressure in order to remove dirt that may be encrusted on the optical element of the optical sensor. Similarly, the term "compressed air stream" denotes the spraying of compressed air under low pressure in order to only spread the cleaning liquid over the optical element and thus help the optical element of the optical sensor to dry.

Moreover, in the following description, the term "metering pump" denotes a pump whose purpose is to inject, in an accurate and repeatable manner, small quantities of liquids or fluids of varying viscosities according to a defined cycle.

Furthermore, in the following description, the term "branch" or "connector" denotes an element for conveying a cleaning liquid to a dispensing nozzle in order for the latter to be able to deposit at least one drop of cleaning liquid on an optical element of an optical sensor.

Finally, in the following description, the term "additive" denotes a product that is added to another in order to improve or change certain properties of same. In the present case, the additive can already be present in the cleaning liquid or added to same, and makes it possible to change certain properties of the cleaning liquid.

FIGS. 1 and 2 show a driver assistance system 10 comprising an optical sensor 3 having an optical element 4 and a cleaning device 1 for cleaning the optical sensor 3, in particular intended to equip a motor vehicle.

Advantageously, the optical sensor 3 is carried by the cleaning device 1. In the embodiment shown in FIGS. 1, 2 and 6 to 10, the optical sensor 3 is a part attached to the cleaning device 1. To this end, the cleaning device 1 comprises a casing 20 having a housing configured to receive the optical sensor 3. This casing 20 is, for example, installed in a body part 22 of the motor vehicle.

In the particular embodiment in FIGS. 1 and 2, the optical sensor 3 is installed in the casing 20 such that the optical element 4 of said optical sensor 3 protrudes from said body part 22 in order to offer a wide angle of view. However, in another embodiment not shown here, the casing 20 carrying the optical sensor 3 can be installed on the outside of the vehicle. The cleaning device 1 according to FIGS. 1 and 2 also allows the optical sensor 3 to continue to operate correctly regardless of the weather conditions and also to maintain a satisfactory level of cleanliness to ensure the correct functioning of same.

More particularly, the cleaning device 1 comprises a cleaning liquid dispensing nozzle 5. The cleaning device 1 advantageously comprises a metering pump 8 that allows the dispensing nozzle 5 to be supplied with cleaning liquid originating from a cleaning liquid tank 12 provided in the motor vehicle. The cleaning device 1 can further comprise a spray element 7 (best viewed in FIGS. 3 and 4) that is described in greater detail below.

In other words, the metering pump 8 is configured to pump the cleaning liquid from the cleaning liquid tank 12 to the cleaning liquid dispensing nozzle 5. The cleaning liquid tank 12 is therefore in fluid communication with the cleaning liquid dispensing nozzle 5.

In the embodiment in FIGS. 1 and 2, the dispensing nozzle 5 has a branch 25 configured to be connected to the metering pump 8 in order to allow the cleaning liquid tank 12 to be brought into fluid communication with the dispensing nozzle 5.

The metering pump 8 can be a separate part from the dispensing nozzle 5.

Alternatively, the metering pump 8 can be included in the dispensing nozzle 5.

In one variant, the metering pump 8 can be a piezoelectric metering pump.

Moreover, the cleaning liquid dispensing nozzle 5 is a drip dispensing nozzle. In reference to FIG. 2, this dispensing nozzle 5 comprises an end configured to deposit one or more drop(s) of cleaning liquid in drips on the optical element 4 of the optical sensor 3. In this particular embodiment, one drop of cleaning liquid corresponds to a volume of 100 μL of cleaning liquid when the optical element 4 has a diameter of 15 mm. Using such volumes to clean the optical element 4 helps greatly reduce the amount of cleaning liquid consumed by the cleaning device 1.

Moreover, in the embodiment illustrated in FIGS. 1 to 3 and 9A, the dispensing nozzle 5 is mounted in a fixed manner on the casing 20. To this end, the casing 20 comprises a support 6 for receiving the dispensing nozzle 5. In this example, said support 6 is arranged in a fixed manner relative to the casing 20.

In other variants, the dispensing nozzle 5 can be mounted movable relative to the support 6.

Therefore, in a first variant, the dispensing nozzle 5 can be configured to be mounted movable in the support 6 between a rest position and an active position. In the rest position, the dispensing nozzle 5 is advantageously retracted relative to an optical element 4 of the optical sensor 3; for example, the dispensing nozzle 5 can be in a withdrawn position. However, in the active position, as illustrated in FIG. 1 or 2, the dispensing nozzle 5 is located above the optical element 4 when the cleaning device 1 is mounted on a motor vehicle, for example. In this active position, one or more drops of cleaning liquid are deposited on the optical element 4 by gravity in order to allow the cleaning liquid to spread over the optical element 4 and wet the dirt that may be encrusted on the optical element 4 so as to desorb said dirt and thus facilitate the elimination of same.

In a second variant, the dispensing nozzle 5 is mounted telescopically movable in the support 6, relative to the optical element 4 of the optical sensor 3.

In a third variant not shown here, the dispensing nozzle 5 can be mounted movable in translation relative to the optical sensor 3. This movable nature of the dispensing nozzle 5 helps protect it from solid airborne particles, such as small pieces of grit, for example, that could block the dispensing nozzle 5 and thus prevent it from functioning correctly.

Returning to the particular embodiment of FIGS. 1 and 2, regardless of the position of the dispensing nozzle 5, it is not in the field of view of the optical sensor 3. Therefore, it does not appear in the images transmitted by the optical sensor 3 to the user and therefore does not prevent the optical sensor 3 from functioning correctly.

In reference to FIGS. 5A to 5C, the end of the dispensing nozzle 5 is arranged in such a way as to allow at least one drop of cleaning liquid to be deposited and has an opening that is, for example, substantially rectangular (FIG. 5A), oval (FIG. 5B), or indeed circular (FIG. 5C), the dimensions of which are chosen so as to be sufficient for the drop(s) deposited on the optical element 4 of the optical sensor 3 to be able to cover a large surface of the optical element 4 and spread easily to then wet the whole of said optical element 4. In particular, the opening of the dispensing nozzle 5 is designed to be wide enough and preferably at least as wide as the optical element 4.

Moreover, the dispensing nozzle 5 is, in the example in FIG. 1, supplied with cleaning liquid by the metering pump 8, in order to deposit a predefined volume of cleaning liquid on the optical element 4 of the optical sensor 3 in drips. Using such a metering pump 8 helps reduce the amount of cleaning liquid consumed by such a cleaning device 1. Indeed, the metering pump 8 makes it possible to draw only the necessary quantity of cleaning liquid from the cleaning liquid tank 12 in order to deposit one or more drop(s) of cleaning liquid on the optical element 4. Moreover, the fact that this cleaning liquid is not sprayed under pressure can also help avoid losses of said liquid as a result of it being sprayed. Indeed, when the cleaning liquid is sprayed onto the optical element 4, drops can bounce off said optical element 4 and be directly lost, which can result in wastage of the cleaning liquid, larger quantities being used to effectively clean the optical element 4, and therefore relatively costly operation of the cleaning device 1.

Finally, the cleaning liquid used can have a higher viscosity than that of water, for example of between 0.001 and 10 Pascal seconds (Pa·s). Using a cleaning liquid that has such a viscosity allows it to spread relatively slowly over the optical element 4, i.e. in such a way as to allow the cleaning liquid to coat the dirt and moisten it sufficiently to reduce its adhesion to the optical element 4, thus helping dislodge it.

Moreover, the cleaning liquid used advantageously has a surface tension of between 17 and 75 (10-3×Newton·m−1), thus allowing the surface of the optical element 4 and the dirt that may be present thereon to be very effectively wet.

The cleaning liquid can also have high detergent power in order to improve its effectiveness in dislodging dirt present on the optical element 4. Moreover, the cleaning liquid can comprise an optically transparent additive configured to deposit a protective layer when the cleaning liquid spreads over the optical element 4 of the optical sensor 3, so as to be able to prevent and limit the adhesion of dirt on said optical element 4 and also facilitate the cleaning of said optical element 4. This optically transparent additive is preferably a compound from the polyethylene glycol family. This additive makes it possible to deposit a protective layer on the optical element 4. This protective layer is advantageously soluble and dirt is deposited on same. When it rains, or a drop of cleaning liquid is deposited on the optical element 4, said protective layer is dissolved and the dirt present on said protective layer is thus easily eliminated.

The spray element 7, which is best viewed in FIG. 4, is advantageously configured to be movable between a stowed position (FIGS. 3 and 9A) and at least one cleaning position (FIGS. 1, 2, 6 to 8, 9B and 10). In the described embodiments, the spray element 7 is movable between a first cleaning position or bottom position (FIG. 6) and a final cleaning position or top position (FIGS. 8 and 10), shifting through one or more intermediate positions (FIG. 7).

When the spray element 7 occupies its stowed position (FIGS. 3 and 9A), it is configured to be positioned outside the field of view of the optical sensor 3. This helps avoid problems that could be linked to the diffraction of light or indeed to the possible distortion of the transmitted images. However, when the spray element 7 occupies one of the cleaning positions, it is positioned in front of the optical sensor 3 (FIGS. 1, 2, 6 to 8, 9B and 10).

The spray element 7 makes, for example, an upward movement when it shifts from its stowed position to one of its cleaning positions, and a downward movement when it shifts from one of its cleaning positions to its stowed position.

In the particular embodiment in FIGS. 6 to 8, the spray element 7 is movable in rotation about an axis perpendicular to an optical axis 30 of the optical sensor 3.

Referring again to FIG. 4, the spray element 7 has a wall 31. This wall 31 has fingers 34 on either side that allow the installation, in a fixed manner or movably in rotation between an inactive position and a position facing the camera, of a flap 32 configured to be positioned in front of the optical sensor 3 when the spray element 7 occupies one of its different cleaning positions. The flap 32 helps, for example, limit the aerodynamic turbulence when the cleaning liquid is deposited on the optical element 4. The flap 32 can also spread the cleaning liquid back to the centre of the optical element 4, thus allowing the cleaning liquid to be deposited only by gravity.

In one variant, the flap 32 can be configured to be positioned in front of the optical element 4 when the vehicle is parked in order to prevent dirt from being deposited on the optical element and thus limit the fouling of same.

In the particular embodiment of FIG. 9A, the flap 32 can be incorporated into or concealed in the body part 22.

In a particular embodiment not shown here, the flap 32 can be made from an optically transparent material such that the optical sensor 3 remains partially operational while its optical element 4 is being cleaned.

In the particular embodiment in FIG. 4, the spray element 7 comprises a nozzle 13 for spraying a compressed air flow that can be used either for spraying a compressed air knife over the optical element 4 in order to remove dirt, or for spraying a compressed air stream over said optical element 4 in order to dry the latter and optionally spread the cleaning liquid over said optical element 4 in order to form a protective layer so as to limit the likelihood of dirt becoming adhered to said optical element 4.

In the illustrated embodiment, the spray nozzle 13 is installed at the end of the wall 31, aligned with the fingers 34, and is separate from said wall 31. In a variant not shown here, the wall 31 can comprise the spray nozzle 13.

In a variant not shown here, the wall 31 can comprise the cleaning liquid dispensing nozzle 5.

In the embodiment in FIGS. 1 to 3 and 10, the spray element 7 comprises an air inlet 11 configured to supply the spray nozzle 13 carried by the containment wall 31 with compressed air, thus allowing the spray nozzle 13 to spray a compressed air flow over the optical element 4. In reference to FIGS. 1 and 4, the air inlet 11 is connected to a compressor 15, for example, that can be used to generate compressed air. The compressed air is then conveyed to the spray nozzle, passing through the channels 37 shown in FIG. 4 that extend on each side of the wall 31 between the air inlets 11 and the spray nozzle 13.

In reference to FIG. 6, when the spray element 7 is in the first cleaning position, the spray nozzle 13 can spray a compressed air flow at the bottom portion of the optical element 4.

In reference to FIG. 7, when the spray element 7 occupies another cleaning position, that corresponds to an intermediate cleaning position, and makes an upward movement, the spray nozzle 13 can spray a compressed air knife at the centre of the optical element 4.

Finally, in reference to FIG. 8, the spray element 7 occupies a final cleaning position, and more specifically an end position as also shown in reference to FIG. 2, the spray nozzle 13 can spray a compressed air knife at the top portion of the optical element 4.

Therefore, the spray nozzle 13 can spray a compressed air knife over the whole of the optical element 4 as a result of the movement of the spray element 7, thus making it possible to dislodge the different pieces of dirt that may be encrusted on the optical element 4. In the particular embodiment of FIGS. 6 to 8, the compressed air is sprayed over the optical element 4 after depositing at least one drop of cleaning liquid on said optical element 4. This drop of cleaning liquid can be deposited both when the spray element 7 is in its first cleaning position (FIG. 6) and in its end position (FIG. 8).

Advantageously, the spray nozzle 13 has a spray opening that can be blade-shaped and shaped to match, in the transverse direction, the shape of the optical element 4 of the optical sensor 3.

The spray nozzle 13 can be configured to adjust the pressure at which the compressed air flow is sprayed over the optical sensor 3.

In the particular embodiment of FIGS. 2, 3, 6 to 8 and 10, the spray element 7 comprises arms 9 in the shape of arcs. In the embodiment shown, each arm 9 has an air inlet 11 in order to supply the spray nozzle 13 with compressed air to be sprayed over the optical element 4 of the optical sensor 3. In reference to FIG. 4, channels 37 for conveying the compressed air can be arranged inside the arms 9.

More specifically, in the particular embodiment of FIGS. 3, 4 and 10, the spray element 7 has two arms 9 arranged on each side of the wall 31.

In the particular embodiment shown, in particular, in FIGS. 3 and 4, the arms 9 are linked to the spray nozzle 13 in order to allow said spray nozzle 13 to move vertically relative to the optical element 4, and preferably over the entire height of said optical element 4.

Moreover, in order to move the spray element 7, the cleaning device 1 advantageously comprises a drive mechanism 21 and 23.

As a non-limiting example, and in reference to FIGS. 3 and 10, the drive mechanism can comprise an element arranged inside the body part 22 that engages with an element carried by the spray element 7. In this example, the drive mechanism comprises an actuator 21 arranged inside the body part 22 and a coupling system 23 carried by one of the two arms 9 of the spray element 7. The arms 9 allow the wall 31 to be linked to the coupling system 23 in order to rotate the spray element 7. More specifically, the arms 9 allow the rotational movement from the drive mechanism to be transmitted to the wall 31 such that the spray element 7 can move from its stowed position to one of its different cleaning positions, and vice versa.

In the particular embodiment shown in FIGS. 6 to 8 and 10, the arms 9 each comprise a stop 33 configured to bear against the body part 22 in which the cleaning device 1 is installed when the spray element 7 reaches the end of its upward movement (FIG. 10), i.e. when the spray nozzle 13 sprays a compressed air flow at the top portion of the optical element 4. Once the stop 33 has come into contact with the body part 22, the actuator 21 is configured to stop rotating or to turn in the opposite direction in order to return the spray element 7 to its stowed position. In the particular embodiment in FIGS. 3 and 4, the coupling system 23 comprises a drive roller 24 on the outer surface of same. The presence of this drive roller 24 ensures the coupling system 23 engages with the actuator 21.

In another embodiment not shown here, the coupling system 23 and the actuator 21 each have a matching gear structure allowing said two elements to engage with each other.

In another embodiment not shown here, the coupling system 23 and the actuator 21 engage by means of a belt.

In yet another embodiment not shown here, the engagement of the coupling system 23 and the actuator 21 is ensured by means of a rack and pinion system.

In another variant that is not shown, the actuator 21 can drive the spray element 7 without an intermediate coupling system 8.

In yet another variant that is not shown, the spray element 7 can be moved by the compressor 15, which sprays compressed air at a pressure high enough to allow said spray element 7 to be moved at the same time as it supplies the spray nozzle 13 with compressed air.

In a variant of FIG. 1, the spray element 7 of the cleaning device 1 can optionally comprise a wiper seal (not shown). This wiper seal can, for example, be made from rubber or from polymer. This wiper seal can help remove the dirt that may have been deposited on the optical sensor 3 by means of a mechanical action. Indeed, when the spray element 7 moves, said wiper seal can rub the optical element 4 of the optical sensor 3, helping eliminate said dirt and therefore increase the effectiveness of the cleaning device 1.

The spray element 7 may also optionally comprise a discharge conduit, not shown here, for discharging the cleaning liquid, connected to a recovery chamber. In this variant, the recovery chamber is in fluid connection with the cleaning liquid tank 12 so as to allow the cleaning liquid to be recycled once it has been used for cleaning the optical element 4 of the optical sensor 3. In such a configuration, the discharge conduit can optionally comprise a filtering unit for purifying the recirculating cleaning liquid. In this particular embodiment, the cleaning device 1 has a recirculation pump (not shown) configured to draw the cleaning liquid flowing through the filtering unit and thus return it to the cleaning liquid tank 12. In one variant, the metering pump 8 and the recirculation pump can be the same pump.

Referring again to FIG. 1, the driver assistance system 10 comprises at least one electronic control unit 35. The electronic control unit 35 is configured to control the cleaning device 1.

The electronic control unit 35 can also be configured to control the drive mechanism 21 and 23 so to move the spray element 7 between its stowed position and one of its different cleaning positions.

The electronic control unit 35 can also be configured to trigger the spraying of the compressed air flow over the optical element 4 when the spray element 7 is moved out of its stowed position. The electronic control unit 35 can also be configured to stop the spraying of the compressed air flow when the spray element 7 has returned to its stowed position. Advantageously, the electronic control unit 35 can be configured to control the pressure at which the compressed air flow is sprayed over the optical element 4. Therefore, the electronic control unit 35 can control the spraying of a compressed air knife or stream over the optical element 4 at the spray nozzle 13.

Moreover, the electronic control unit 35 can be also be configured to control the volume of cleaning liquid drawn by the metering pump 8. Controlling the metering pump 8 makes it possible to draw, from the cleaning liquid tank 12, and to deposit, on the optical element 4, only the volume necessary to clean said optical element 4, such as, for example, the volume necessary in order to deposit a drop on the optical element 4, which allows the cleaning device 1 to operate more economically than cleaning devices that use systems that spray cleaning liquid, for example.

The electronic control unit 35 can also be configured to control the movement of the dispensing nozzle 5 between its rest position and its active position, and vice versa.

The electronic control unit 35 can also be configured to control the movement of the flap 32 between its inactive position and its position facing the camera when it is mounted movable in rotation on the fingers 34 of the wall 31.

The dispensing nozzle 5 can optionally comprise a heating element controlled by the electronic control unit 35 and configured to heat the cleaning liquid before it is deposited on the optical element 4. The optical element 4 can be de-iced in this way, and the optical sensor 3 can continue to operate correctly regardless of the weather conditions.

The electronic control unit 35 can also comprise dirt detection means in order to automatically control the cleaning of the optical element 4, for example when the dirt detection means detect fouling that can adversely affect the quality of the transmitted images and therefore the correct operation of the optical sensor 3.

In another embodiment that is not shown, the electronic control unit 35 can be configured to control the cleaning of the optical element 4 when the user of the vehicle shifts into reverse gear, for example, when the driver assistance system 10 comprises a camera installed at the rear of a vehicle, for example.

In a variant that is not shown, the electronic control unit 35 can be controlled by the user of the vehicle him or herself.

In reference to FIGS. 6 to 12, the method for cleaning the optical sensor 3 implementing the cleaning device 1 according to the embodiment of FIGS. 1 to 4 is now described in greater detail.

The method implemented in order to clean the optical sensor 3 can comprise a step E1 of activating the dispensing nozzle 5. During this step E1, the metering pump 8 is activated and starts drawing cleaning liquid from the cleaning liquid tank 12 of the vehicle.

This step can also optionally allow the dispensing nozzle 5 to be moved from its rest position to its active position when this dispensing nozzle 5 is mounted movable in the cleaning device 1. In a variant or additionally, this step E1 can also trigger the heating of the dispensing nozzle 5 so as to spray heated cleaning liquid onto the optical element 4.

The method next comprises a step E2 of moving the spray element 7 which involves moving the spray element 7, in particular in an upward movement from the stowed position (FIG. 9A) to at least the first cleaning position (FIG. 6). The movement can be continuous until the final cleaning position is reached (FIGS. 8, 9B and 10). This step E2 can optionally allow the flap 32 to be moved such that it shifts from its inactive position to its position facing the camera when the flap 32 it is mounted movable in rotation on the fingers 34.

The method according to FIG. 11 also comprises a step E3 during which a first drop of cleaning liquid is deposited by gravity on the optical element 4 of the optical sensor 3 when the spray element 7 occupies its first cleaning position. During this step E3, the drop of cleaning liquid spreads over the optical element 4 and wets the different pieces of dirt in order to desorb them. If the protective layer left by the additive is already present, the deposition of this first drop of cleaning liquid makes it possible to dissolve said protective layer and thus eliminate any dirt that may have been deposited on it.

In a variant, step E3 can be implemented when the spray element 7 occupies its top cleaning position, as in reference to FIGS. 2, 9B and 10.

The cleaning method comprises a step E4 during which a first compressed air flow is sprayed over the optical element 4. More specifically, in this embodiment and in reference to FIG. 6, the first compressed air flow corresponds to a compressed air knife that is sprayed over the optical element 4 in order to dislodge the dirt present on said optical element 4.

The spraying of this compressed air knife can begin when the spray element 7 leaves the stowed position and shifts into the first cleaning position. This step can be implemented after a time period long enough for the drop of cleaning liquid deposited during step E3 to have had the time to run over the whole of the optical element 4 and moisten the different pieces of dirt that may be present on said optical element 4.

This step E4 lasts as long as required for the spray element 7 to shift through its different cleaning positions as shown in reference to FIGS. 6 to 8, such that the compressed air knife sweeps over the whole of the optical element 4, thus making it possible to dislodge the different pieces of dirt that may have become encrusted on said optical element 4.

In a variant, when the drop of cleaning liquid is deposited on the optical element 4 and the spray element 7 is in the top position, step E4 is implemented by moving the spray element 7 from its top position to its bottom position.

At the end of this step E4, the electronic control unit 35 can be configured to assess the level of cleanliness of the optical sensor 3 using the dirt detection means. If the level of cleanliness of the optical element 4 is satisfactory (loop A), the electronic control unit 35 controls the implementation of a step E5 corresponding to the downward movement of the spray element 7 in order to bring said spray element 7 from the cleaning position in which it is located to its stowed position (FIG. 9A). In this case, the electronic control unit 35 can also control the stopping of the spraying of the compressed air flow at the spray nozzle 13. In the particular embodiment in FIGS. 6 to 10, the flap 32 can act to stop the operation of the drive mechanism 21 and 23 when the spray element 7 has returned to its stowed position. However, if the level of cleanliness is not considered satisfactory by the dirt detection means (loop B), the electronic control unit 35 can repeat the cleaning sequence described above.

In one variant, the method can comprise a preventive treatment cycle after the cleaning cycle.

In reference to FIG. 12, this preventive treatment cycle comprises two additional steps E3' and E4' compared to the cleaning cycle (steps E1 to E4) described above.

In this case, following the step E4 of spraying the compressed air knife over the optical element 4, a second drop of cleaning liquid is deposited on the optical element 4 (step E3'), followed by a step E4' of drying the optical element 4 by spraying a second compressed air flow over the optical element 4. The second air flow is sprayed over the optical element 4 at a pressure lower than that of the first compressed air flow. More specifically, during this drying step E4', the compressed air flow sprayed by the spray nozzle 13 over the optical element 4 corresponds to a compressed air stream. Spraying this compressed air stream makes it possible to dry the optical element 4. Advantageously, using a compressed air stream to dry the optical element 4 also makes it possible to spread the cleaning liquid over said optical element 4 and, optionally, to thus form a protective layer to limit the likelihood of dirt adhering to said optical element 4 if the cleaning liquid has properties that help reduce the adhesion of dirt.

After these cleaning cycles (steps E1 to E4) and preventive treatment cycles (steps E3' and E4'), the detection means of the electronic control unit 35 can once more assess the level of cleanliness of the optical element 4. As previously, if the level of cleanliness of the optical element 4 is sufficient (loop A), the spray element 7 is moved by the drive mechanism 21 and 23 to return to its stowed position, according to step E5. However, if the level of cleanliness is not considered satisfactory (loop B), the electronic control unit 35 controls the implementation of a new cleaning cycle, in particular steps E3 and E4 of the cleaning cycle, and/or a new preventive treatment cycle (steps E3' and E4') as described above.

During step E5, the dispensing nozzle 5 can also return to its rest position when this dispensing nozzle 5 is mounted movable in the cleaning device 1.

Advantageously, the duration of the cleaning cycle and the preventive treatment cycle is between one and two seconds, which allows the driver assistance system 10 to be swiftly operational when the optical sensor 3 needs to be cleaned.

These embodiments are provided for illustrative purposes and are non-limiting. Indeed, it would be quite possible for a person skilled in the art to replace the actuator with any other kind of actuator allowing the spray element 7 to be moved from its stowed position to its cleaning position, and vice versa, without departing from the scope of the present invention. Moreover, it would be quite possible for a person skilled in the art to use a cleaning liquid having a viscosity index lower or higher than that described here, without departing from the scope of the present invention. Moreover, it would be quite possible for a person skilled in the art to deposit more than one drop of cleaning liquid on the optical element 4, such as two or three drops, for example, in the form of drips, by gravity, without departing from the scope of the present invention. It would also be quite possible for a person skilled in the art to reverse or interchange the steps of the method, in particular by reversing the step E2 of moving the spray element 7 to a cleaning position and the step E3 of depositing a drop of cleaning liquid, for example, without departing from the scope of the present invention. Moreover, it would be quite possible for a person skilled in the art to use any other type of optically transparent additive allowing a semi-soluble protective layer to be deposited on the optical element 4 in order to prevent it from being fouled and facilitate the cleaning of said optical element, without departing from the scope of the present invention.

Therefore, the quick, effective and economical cleaning of the optical element 4 of an optical sensor 3, such as, for example, the external lens of a camera, intended to equip a motor vehicle, is made possible by the cleaning device 1 described here. Advantageously, when it is necessary to use cleaning liquid, the quantities used are generally small, which helps reduce the operating costs of such a cleaning device 1. Moreover, it is not necessary to increase the size of the tank storing this cleaning liquid, in view of the low consumption proposed by the cleaning device 1.

The invention claimed is:

1. A device for cleaning an optical sensor, comprising:
a nozzle for dispensing a cleaning liquid, wherein the cleaning liquid dispensing nozzle is a drip dispensing nozzle and is configured to deposit the cleaning liquid on the optical sensor in individual drops; and a spray element configured to spray compressed airflow over the optical sensor, the spray element being an additional element relative to the nozzle, wherein the device is equipped in a motor vehicle.

2. The device for cleaning an optical sensor according to claim 1, further comprising a support for the cleaning liquid dispensing nozzle, said support being arranged in a fixed manner relative to the cleaning device.

3. The device for cleaning an optical sensor according to claim 2, wherein the cleaning liquid dispensing nozzle is mounted movable in the support between:
  a rest position in which the dispensing nozzle is configured to be retracted relative to an optical element of the optical sensor, and
  an active position in which the dispensing nozzle is configured to be located above the optical element of the optical sensor so as to deposit said at least one drop of cleaning liquid on the optical element by gravity.

4. The device according to claim 1, wherein the cleaning device comprises a metering pump configured to supply the dispensing nozzle with cleaning liquid in order to deposit a predefined volume of cleaning liquid on the optical sensor in drips.

5. The device for cleaning an optical sensor according to claim 1, wherein the spray element is movable between:
  a stowed position in which the spray element is configured to be positioned outside the field of view of the optical sensor, and
  at least one cleaning position in which the spray element is configured to be positioned in front of the optical sensor.

6. The device for cleaning an optical sensor according to claim 5, wherein the spray element comprises a nozzle for spraying a compressed air flow over the optical element when the spray element is in a cleaning position.

7. The device for cleaning an optical sensor according to claim 5, wherein the cleaning device comprises a drive mechanism configured to move the spray element between the stowed position and said at least one cleaning position.

8. The device according to claim 5, wherein the spray element is movable in rotation between the stowed position and said at least one cleaning position.

9. A driver assistance system comprising at least one cleaning device according to claim 1; at least one optical sensor; and at least one electronic control unit configured to control the cleaning device.

10. The driver assistance system according to claim 9, wherein the electronic control unit is configured to control the drive mechanism, so to move the spray element between the stowed position and said at least one cleaning position.

11. The driver assistance system according to claim 9, wherein the electronic control unit is configured to trigger the spraying of the compressed air flow over the optical element when the spray element is in a cleaning position and to stop said spraying of the compressed air flow when the spray element is in the stowed position.

12. The driver assistance system according to claim 11, wherein the electronic control unit is configured to control the pressure at which the compressed air flow is sprayed over the optical element of the optical sensor.

13. The driver assistance system according to claim 1, wherein the electronic control unit is configured to control the volume of cleaning liquid drawn by the metering pump and deposited in drips on the optical element of the optical sensor.

* * * * *